United States Patent [19]

Harrison

[11] 4,079,513
[45] Mar. 21, 1978

[54] HAND TOOLS
[75] Inventor: Christopher R. B. Harrison, Porthcawl, Wales
[73] Assignee: Wilkinson Sword Limited, England
[21] Appl. No.: 761,994
[22] Filed: Jan. 24, 1977
[30] Foreign Application Priority Data
Feb. 6, 1976 United Kingdom ............... 4680/76
[51] Int. Cl.² ............................................ B26B 17/00
[52] U.S. Cl. ............................................... 30/193
[58] Field of Search ................ 30/193, 191, 90.8, 165
[56] References Cited
U.S. PATENT DOCUMENTS
3,372,478  3/1968  Wallace et al. ........................ 30/193

Primary Examiner—Robert C. Watson
Attorney, Agent, or Firm—Leydig, Voit, Osann, Mayer & Holt

[57] ABSTRACT

A hand tool, for example a garden pruner, has two members movable together or apart by handles connected to the members, a first one of the members having a surface accurately located with respect to a corresponding surface of the other member. The first mentioned surface is formed on a first part of the member which, at an intermediate stage in the assembly of the tool, is supported for tilting movement on a second part of the member to allow said surfaces to be accurately located relative to each other, after which the first and second parts are rigidly secured together by fixing means. As an example the hand tool can be a garden pruner, the first member comprising an anvil and the other member a blade cooperative with the anvil.

3 Claims, 9 Drawing Figures

HAND TOOLS

This invention relates to hand tools comprising two co-operating members which are arranged to be moved relatively towards and away from one another by handles which are connected to the respective co-operating members.

According to the present invention there is provided a hand tool comprising two co-operating members which are movable relatively to each other by handles connected to the respective members, one of said members having a surface which is accurately located with respect to a corresponding surface of the other member, said one member comprising a first part on which said surface is formed and a second part which at a stage in the assembly of the tool supported the first part for tilting movement to allow said surfaces to be brought into accurate mutual location, and fixing means by which said first and second parts are held rigidly and permanently with respect to each other.

The present invention also provides a hand tool comprising two co-operating members which are movable relatively to each other by handles connected to the respective members one of said members having a surface which is accurately located with respect to a corresponding surface of the other member, said one member comprising a first part having therein a trough shaped recess of which the end surfaces form inclined ramps, and a second part having thereon spaced surfaces which engage said ramps yet leaving a gap between said second part and the bottom of the recess over substantially the whole length thereof, and means rigidly securing said first and second parts together.

The present invention further provides a hand tool comprising two co-operating members which are movable relatively to each other by handles connected to the respective members, one of said members having a surface which is accurately located with respect to a corresponding surface of the other member, said one member comprising a first part on which said surface is formed and a second part on which said first part is supported, the first and second parts being so shaped with respect to each other as to permit relative tilting movement therebetween to change the relative location of said surfaces if the first and second parts were free to move relatively, and means rigidly and permanently securing said first and second parts together.

According to another aspect, the present invention provides a method of constructing a hand tool comprising two co-operating members which are movable relatively to each other by handles connected to the respective members, one of said members having a surface which is accurately located with respect to a corresponding surface of the other member, which comprises forming one said member in two parts one of which is capable of tilting relatively to the other, tilting said first and second parts with respect to each other until said surfaces are accurately located and thereafter rigidly and permanently securing said first and second parts together.

One construction of garden pruner of the anvil type, which is in accordance with the invention, will now be described by way of example with reference to the accompanying drawings, in which.

Figure 1:
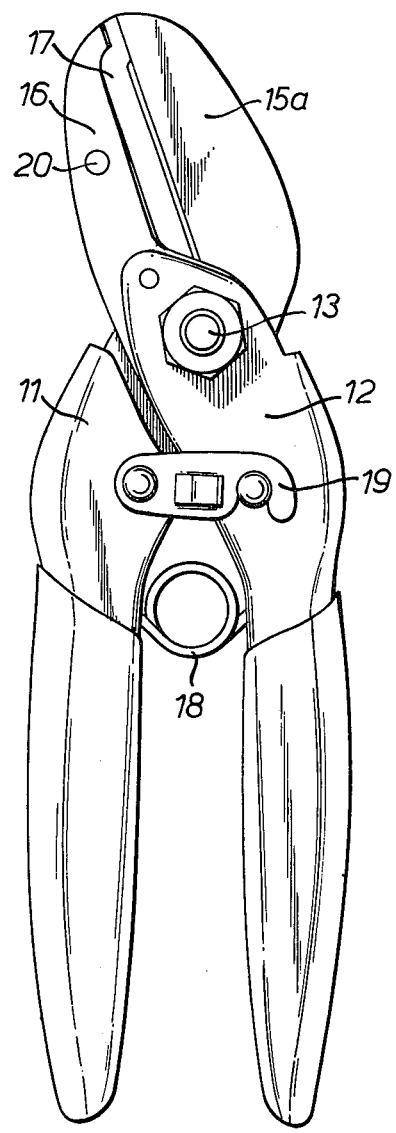
FIG. 1 is a side view of the pruner in the closed position.
Figure 2:
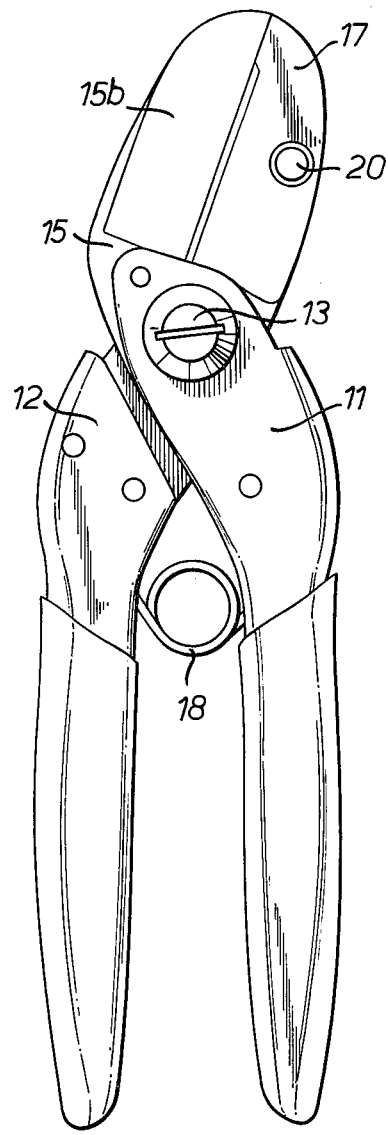
FIG. 2 is a view of the same pruner seen from the opposite side.
Figure 3:
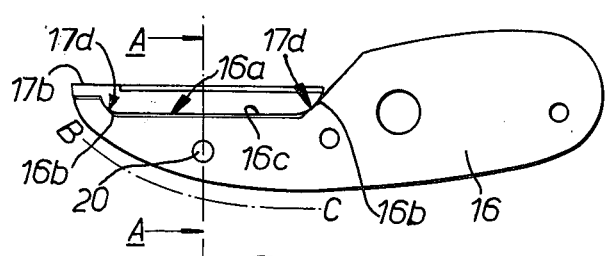
FIG. 3 is a side view of an anvil and anvil-supporting member of the pruner of FIG. 1.

As shown in the drawings, the pruner comprises two handles 11, 12 which are interconnected by a pivot bolt 13. The handle 11 carries, at its forward end, a blade 15, and the handle 12 carries at its forward end an anvil-supporting member 16 on which an anvil 17 is secured. By movement of the handles, the blade and anvil are brought together. A spring 18 is connected between the levers to bias them apart, and a catch 19 is provided to secure the handles in the closed position.

In order to provide a clean cutting action, it is important that, in the closed position of the pruner, the cutting edge of the blade and the working face of the anvil should make contact along their length. If, due to tolerances arising in manufacture, this does not occur, a thin wedge-shaped gap will remain between the anvil and the blade edge and the cleanness of cut will deteriorate progressively along the blade edge in one direction or the other.

Figure 4:
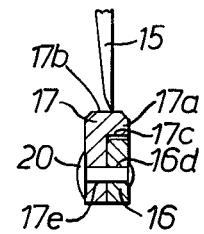
FIG. 4 is a section on the line IV-IV of FIG. 3 but showing the blade in position on the anvil.
Figure 5:
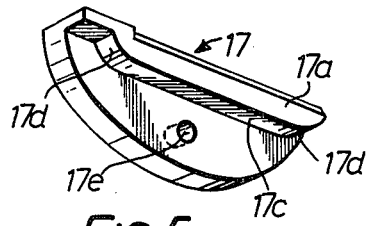
FIG. 5 is a perspective view of the anvil of FIG. 3.
Figure 6:
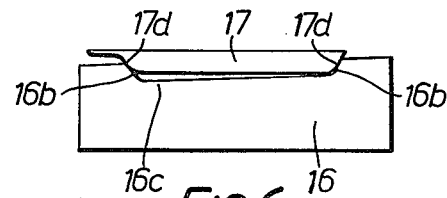
FIGS. 6 and 7 illustrate the tilting action of the anvil on the anvil supporting member and FIGS. 8a and 8b are enlarged diagrammatic representations of alternative shapes of cutting blade surfaces.
Figure 7:
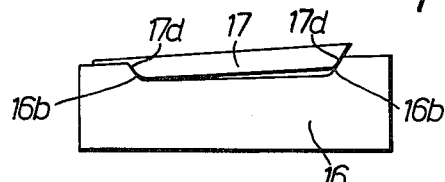

In order to improve the accuracy of alignment between the blade and anvil, the anvil is formed as a plate having an elongate shoulder or rib 17a extending along its length adjacent the working surface 17b of the anvil, so that the anvil is of L shaped cross-section (FIG. 4). The face 17c of the rib opposite the working surface 17b is straight over a substantial part of its length, but each end 17d of the face 17c is curved towards the working surface of the anvil, the curved ends being adjacent the ends of the anvil.

The anvil supporting member 16, on its edge directed towards the blade, is formed with a recess 16a for receiving the profiled surface 17c, 17d of the rib. This recess however at its opposite ends is formed with ramps 16b inclined at an angle, for example of 45°, to the flat base 16c of the recess. The ramps 16b are provided for engagement with the curved ends 17d of the rib such that if one curved end of the rib is at the base of its associated ramp, the other curved end of the rib lies at a position at least part of the way up its associated ramp. It will be seen that, if pressure is applied to the working surface of the anvil at one raised end, the anvil can be tilted by causing the adjacent curved end of the rib to ride down its associated ramp, the other curved end of the rib riding up its associated ramp.

In order to lock the anvil to the anvil support member, a hole 17e is formed in the anvil through which a rivet 20 is passed to engage with hole 16d in the anvil supporting member. Conveniently the anvil supporting member is of steel and the anvil of a material softer than the heat-treated blade. The hole in the anvil can be drilled after the anvil has been correctly positioned. Alternatively an elongate hole can be formed in the anvil. After the rivet has been inserted through the anvil support member and anvil, it is secured with sufficient adhesion or friction between the anvil and supporting member to prevent subsequent movement. If necessary an adhesive can be applied between the contacting surfaces to increase adhesion. Instead of a rivet, other equivalent permanent (i.e. nonreleasable) fixing means can be used.

In assembling the pruner, the anvil 17 is positioned on the anvil supporting member 16 and the blade 15 closed down on to the anvil. The inclination of the ramps is such as to enable the anvil to tilt until its working surface lies in contact along its length with the blade edge, and when this alignment has been achieved the anvil is secured to the anvil support member as indicated above.

As an alternative to the construction specifically described above, inclined ramps instead of the curved portions, can be formed on the rib of the anvil and the corresponding curved portions can be formed at the ends of the recess in the anvil support member.

Moreover, although reference has been made to co-operating curved portions, and ramps formed adjacent opposite ends of the anvil, these curved portions and ramps could be provided closer to the centre of the anvil, but this would have the disadvantage of decreasing the stability of the anvil and increasing the strain on the rivet in operation of the pruners.

Although the invention has been described with reference to its application to an anvil-type pruner, it will be appreciated, as indicated above, that the invention is applicable to other tools in which it is important that two co-operating surfaces be aligned with one another during assembly, the part carrying one of said surfaces thereafter being locked in position.

Figure 8A:
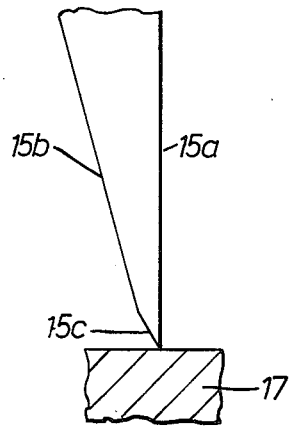
Figure 8B:
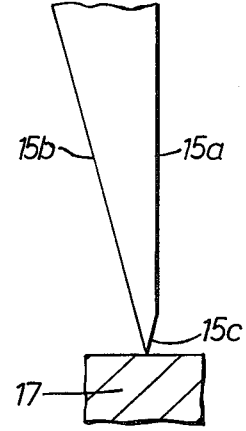

A further feature of the pruner described is the use of a blade of asymmetric cross-section. As shown in FIGS. 8a and 8b, such a blade may have a planar face 15a which lies in a plane which is substantially perpendicular to the plane in which the anvil working surface 17b lies. The other face 15b is inclined at an angle, for example of 15°, to the planar surface. Adjacent its tip, the angle between the faces 15a and 15b is increased as shown at 15c, for example to 30°, in either of the ways shown in FIGS. 8a and 8b. In FIG. 8b, when faces 15b and 15c are both inclined at 15° to the planar surface, the cutting forces on the cutting edge are balanced.

Preferably, at least part of one or both faces of the blade are coated with a polymer having a low coefficient of friction, for example resin-bonded polytetrafluoroethylene.

I claim:

1. A hand tool comprising two co-operating members, handles connected to the respective members for moving the members relatively to each other, one of said members having thereon a surface which is accurately located with respect to a corresponding surface of the other member, said one member comprising a first part having therein a an elongate trough shaped recess, the recess having end surfaces which form steeply inclined ramps, and a second part having thereon spaced surfaces which engage said ramps yet leaving a gap between said second part and the bottom of the recess over substantially the whole length thereof, and means rigidly and permanently securing said first and second parts together.

2. A hand tool according to claim 1 wherein said one member comprises an anvil forming said second part and an anvil-supporting member forming said first part and the other member comprises a blade engageable with the anvil.

3. A method of constructing a hand tool comprising two co-operating members which are movable relatively to each other by handles connected to the respective members, one of said members having a surface which is accurately located with respect to a corresponding surface of the other member, which comprises the steps of forming one said member in two parts one of which is capable of tilting relatively to the other, forming in one of said parts a trough shaped recess having two steeply inclined ramp-forming end surfaces, forming two spaced-apart surfaces on the other of said parts for engagement respectively with said ramp-forming surfaces to permit said parts to tilt relatively to one another by movement of a first one of said spaced-apart surfaces up a first one of said ramp-forming surfaces while the second of said spaced-apart surfaces moves down the second of the ramp-forming surfaces, and vice versa, tilting said first and second parts with respect to each other until said surfaces are accurately located and thereafter rigidly and permanently securing said first and second parts together.

* * * * *